United States Patent [19]

Premont

[11] Patent Number: 4,490,092

[45] Date of Patent: Dec. 25, 1984

[54] CONTAINMENT STRUCTURE

[75] Inventor: Emile J. Premont, South Hadley, Mass.

[73] Assignee: United Technologies Corporation, Hartford, Conn.

[21] Appl. No.: 332,695

[22] Filed: Dec. 21, 1981

[51] Int. Cl.³ .................. F01D 21/00; F01B 25/16
[52] U.S. Cl. .......................................... 415/1; 415/9; 415/119; 415/219 R; 416/218; 416/190; 138/110
[58] Field of Search ............. 415/9, 119, 219 R, 197, 415/121 G, 108, 128, 196; 416/230, 218, 190, 192; 403/43, 44, 45, 46, 344; 156/172, 184, 189, 191, 185, 162; 242/117, 77.3, 77.4; 138/148, 113, 114, 99, 110, 148; 181/400, 401, 118, 204, 207, 183, 214, 213, 222, 224; 220/414; 24/265 R, 136 R, 134 N, 132 W, 133; 139/387 R

[56] References Cited

U.S. PATENT DOCUMENTS

| | | | |
|---|---|---|---|
| 1,698,514 | 1/1929 | Schmidt . | |
| 2,988,302 | 6/1961 | Smith | 415/119 |
| 3,203,180 | 8/1965 | Price | 415/115 |
| 3,481,427 | 11/1968 | Dobbs | 415/119 |
| 3,542,152 | 11/1970 | Adamson | 415/119 |
| 3,684,205 | 8/1972 | Rogow | 242/75.3 |
| 3,794,708 | 8/1972 | Richards et al. | 156/189 |

FOREIGN PATENT DOCUMENTS

| | | | |
|---|---|---|---|
| 27756 | 4/1981 | France | 415/9 |
| 2037900 | 7/1980 | United Kingdom | 415/219 R |

Primary Examiner—Samuel Scott
Assistant Examiner—Brian J. Bowman
Attorney, Agent, or Firm—Gene D. Fleischhauer

[57] ABSTRACT

A circumferentially extending structure 30 for containing particles having an axial component and a radial component of velocity is disclosed. The apparatus is comprised of a support structure 46 and a fabric 44 wrapped under tension about the support structure such that the installed length of the fabric is greater than the free length of the fabric. In one particular embodiment the fabric is coated with a layer of epoxy resin such that the resin penetrates only the top layer of the fabric to form a shield 95 which protects the containment fabric from injury. A method for forming the circumferentially extending structure is disclosed which includes the steps of forming a support structure and wrapping a fabric about the support structure under a preload to cause an elongation of the fabric and tension in the fabric in the installed condition.

16 Claims, 18 Drawing Figures

CONTAINMENT STRUCTURE

TECHNICAL FIELD

This invention relates to a circumferentially extending structure for containing particles having an axial component of velocity and a radial component of velocity. The invention has particular application to the field of axial flow rotary machines and to the containment of particles resulting from the separation of a rotor blade from a rotating assembly in such a machine but is not limited to the field of axial flow rotary machines.

BACKGROUND ART

In axial flow rotary machines, rotor assemblies are driven at high rotational speeds about an axis of rotation. The rotor assemblies include rotor disks and rotor blades. Foreign objects, such as birds, hailstones or other objects, which on occasion are ingested into the engine may strike the blades causing parts of the rotor assembly to fragment or to separate from the rotor disk. During such a failure pieces of the rotor assembly may be hurled outwardly from the rotor assembly with velocities of several hundred feet per second. Such velocities typically have components in the axial, tangential and radial directions. One device for containing such fragments is shown in British Patent Specification 1,245,415 issued to Mottram et al entitled "Improvements in or Relating to Fluid Flow Machines". Mottram shows a containment structure formed of two similar metal strip members wound together to form a helical shield about a casing. U.S. Pat. No. 2,999,667 entitled "Protective Arrangement for Use with Apparatus or Machines Having Rotating Parts" issued to Morley shows a containment structure formed of a web of interwoven wires which are continuous from one end of the web to the other. The web is disposed in coil form in a casing about an array of rotor blades.

Several patents show containment structures formed from synthetic fibers which are woven into a fabric or webbing. U.S. Pat. No. 4,057,359 entitled "Ballistic Nylon Fabric Turbine Governor Housing Shielding Means" issued to Grooman shows a flexible housing cover formed by stitching together two sections of a ballistic nylon fabric. Grooman mentions nylon, an aliphatic polyamide fiber, and Kevlar 49, an aromatic polyamide fiber available from the DuPont Corporation, as Fibers which are suitable for forming the fabric. U.S. Pat. No. 3,602,602 issued to Motta entitled "Burst Containment Means" shows a containment means formed of a winding of tape over a machinery housing and aligned with the expected path of travel of part fragments to contain the part fragments during a failure of the rotary machine. No means are provided for bonding or fastening the adjacent turns of the winding to each other or to the housing about which the tape is wound. The winding of tape is formed of a ballistic nylon material rather than of an aromatic polyamide fiber fabric such as a Kevlar fabric. Use of a Kevlar fabric restrained in the fore and aft direction along the edges outwardly of Kevlar felt trapped radially between the Kevlar fabric and a honeycomb backed steel shell is a contemporaneous recommendation for a containment structure made in a NASA Final Report entitled "Development of Advanced Lightweight Containment Systems". This report was made under NASA Contract No. NAS3-21823.

In spite of this progress in containment structures, scientists and engineers are seeking to develop containment means which are light in weight and yet which provide containment of particles such that the particles do not escape from the nacelle surrounding the engine even though the particles have substantial axial, tangential and radial velocities.

DISCLOSURE OF INVENTION

According to the present invention, a structure for containing particles includes a circumferentially extending structure wrapped with a fabric under tension such that the installed length of the fabric is greater than the free length of the fabric.

In accordance with the present invention, a method for wrapping a fabric about a circumferentially extending structure to form a containment structure includes the step of preloading the fabric with a controlled tension to affect the operative movement of the fabric.

A primary feature of the present invention is a support structure wrapped with a fabric under tension. The installed length of the fabric is greater than the free length of the fabric. In one embodiment, an end of the fabric is secured to the support structure. The other end of the fabric is secured to the exterior of the fabric. In another embodiment, the installed length of the fabric is five percent (5%) greater than the free length of the fabric. In one detailed embodiment, a coat of epoxy resin is applied to the exterior surface of the fabric after the wrapping is completed.

A primary advantage of the present invention is the containment of projectiles within the nacelle during a blade failure of the rotary machine. Another advantage is the ability of the containment structure to block the escape of secondary fragments which might otherwise pass through holes formed during the passage of large fragments through the support structure by minimizing the shifting or forlding of the fabric away from such holes. Another advantage is the smaller radial profile of the nacalle which results from decreasing the radial deflection of the fabric during the impact of a particle as compared with structures using untensioned fabric. Still another advantage is the avoidance of the escape of large particles between the edge of the fabric and the support structure.

Other features and advantages will be apparent from the specification and claims and from the acccompanying drawings which illustrate an embodiment of the invention.

BRIEF DESCRIPTION OF DRAWINGS

FIG. 7 is an exploded schematic illustration of the support structure shown in FIG. 2 illustrating the method of assembling the support structure;

FIG. 9a is a schematic illustration of an alternate embodiment of the apparatus shown in FIG. 8a;

BEST MODE FOR CARRYING OUT THE INVENTION

Figure 1:
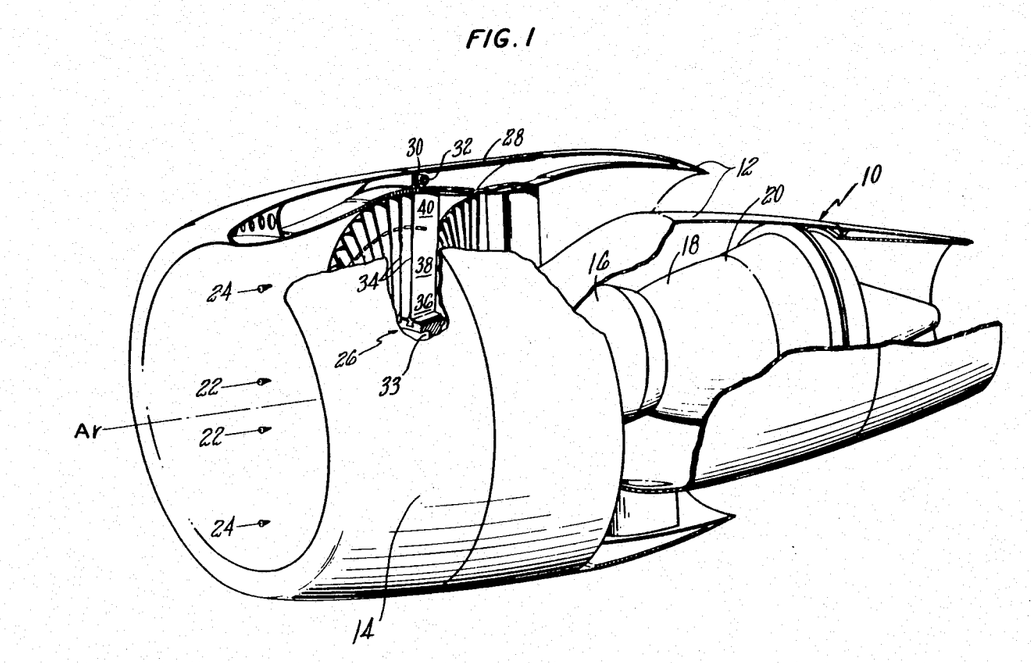
FIG. 1 is a perspective view of an axial flow gas turbine engine mounted in an aircraft nacelle with a portion of the nacelle and the engine broken away to show an array of rotor blades and the adjacent fan case structure in the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flow path 22 for working medium gases extends rearwardly through these sections. A secondary flow path 24 for working medium gases extends rearwardly, outwardly of the primary flow path.

The fan section 14 includes a rotor assembly 26 and a stator assembly 28. The stator assembly has an axially extending fan case 30 which forms an inner wall of the nacelle 12. Service components such as a duct 32 for anti-icing air and a starter (not shown) for starting the aircraft with compressed air are disposed radially outwardly of the fan case. The rotor assembly includes a rotor disk 33 and a plurality of rotor blades 34. Each rotor blade has a root region 36, a mid-span region 38 and a tip region 40. The rotor blades extend outwardly from the disk across the working medium flow paths into proximity with the stator assembly.

Figure 2:
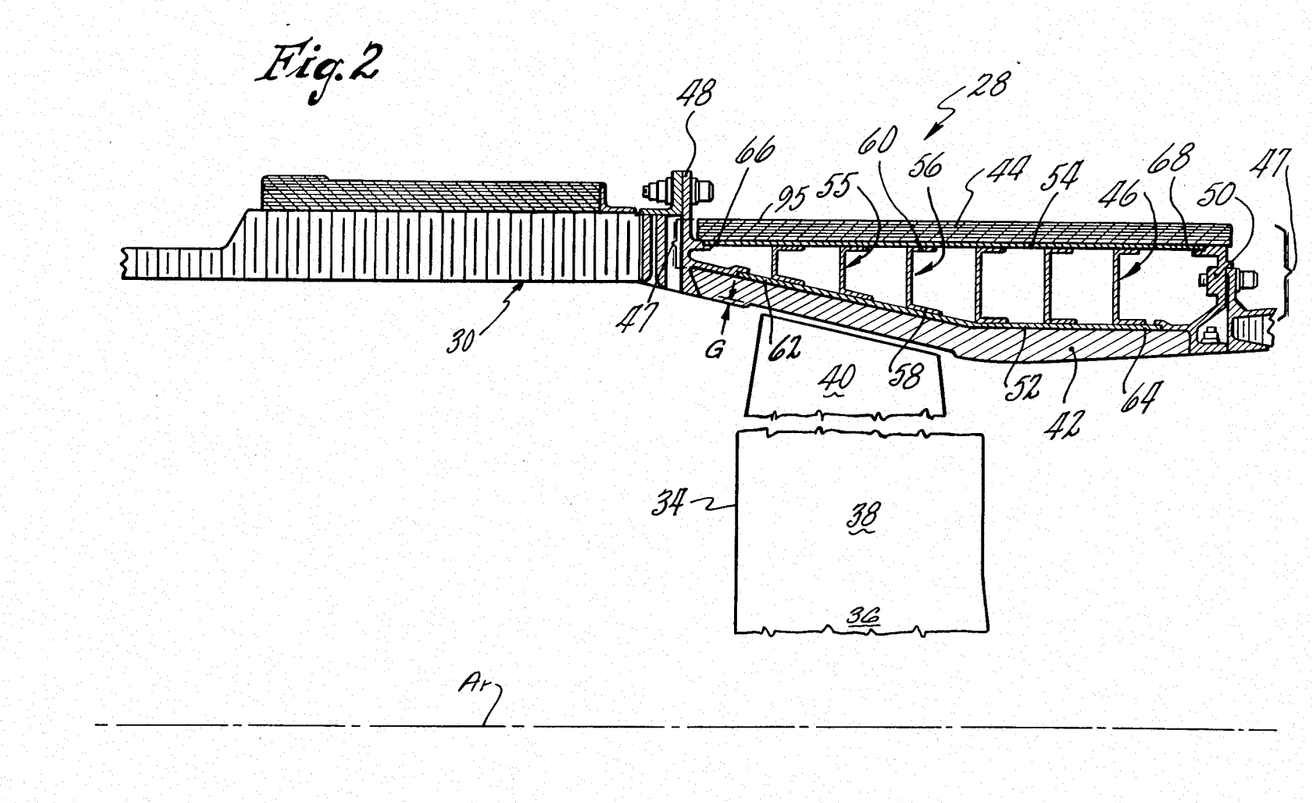
FIG. 2 is a cross-sectional view of the fan case structure adjacent the rotor blade and is a side elevation view of the rotor blade with portions of the rotor blade broken away.

FIG. 2 is an enlarged cross-sectional view of the stator assembly 28 and shows the fan case 30 and one of the rotor blades 34 with portions of the rotor blade broken away. Each rotor blade is spaced radially from the fan case leaving a gap G therebetween. The fan case outwardly of the rotor blade is formed of a rub strip 42, a fabric 44 and a structure 46 for supporting the rub strip andd the fabric. The support structure 46 and the fabric 44 form a circumferentially extending structure 47, for containing particles having an axial component of velocity and a radial component of velocity. Such a structure is often referred to as a "containment case". The term "support structure" includes but is not limited to lightweight structures such as a honeycomb structure or the structure shown and heavier structures such as solid metal cases.

The fabric 44 extends circumferentially about the support structure 46 under tension such that the installed length of the fabric is greater than the free length of the fabric. The term "fabric" includes, but is not limited to, tape, woven material or the like and may be formed of organic or inorganic material. One satisfactory fabric is formed from a yarn made of aromatic polyamide fibers such as Kevlar 29. (Kevlar is a registered trademark of the DuPont Corporation). The yarn has a fineness of fifteen hundred (1500) deniers. The yarn is woven with a twenty-four (24) strand by twenty-four (24) strand basket weave pattern into a fabric having selvaged edges. A satisfactory fabric having selvaged edges is available as Style 120 Kevlar Fabric from Fabric Development, Incorporated, Quakertown, Pa.

Figure 3:
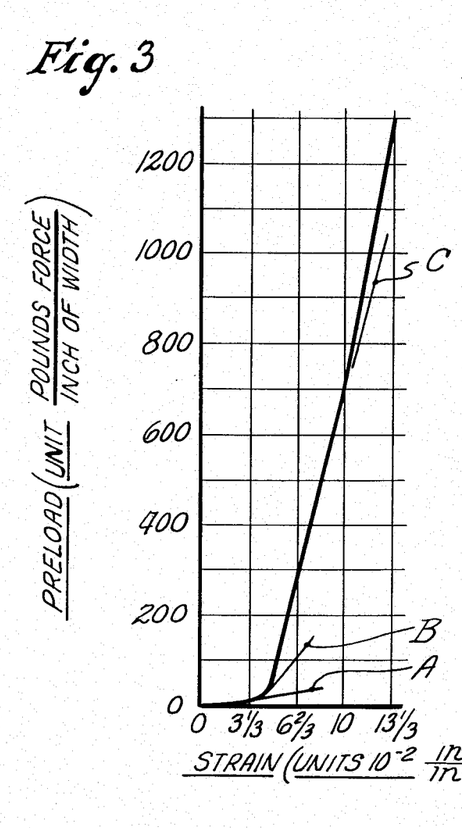
FIG. 3 is a graphical representation of the axial force required to cause an incremental increase in the length of a fabric.

FIG. 3 is a graphical representation of the elongation per length of woven Kevlar 29 fabric resulting from a force acting in the direction of elongation. The vertical axis of the graph is the total force applied to the fabric divided by the width of the fabric in inches. The horizontal axis is the quantity resulting from dividing the total elongation resulting from the application of the force by the free length of the fabric before elongation. The slope of the curve at any point along the curve is a constant of proportionality between the force per unit of width, and the elongation per unit of length of the fabric. The constant of proportionality is often called the force constant, or the stiffness coefficient or the spring constant of the fabric. Thus, the spring constant is defined as the ratio of the force per unit of elongation and may be expressed in pounds force per inch (lbf/in.), or newtons per meter, or in dynes per centimeter. The line A, the line B and the line C shown in FIG. 3 approximate three spring force constants of the fabric which are nearly linear over a range of deflection.

Figure 4:
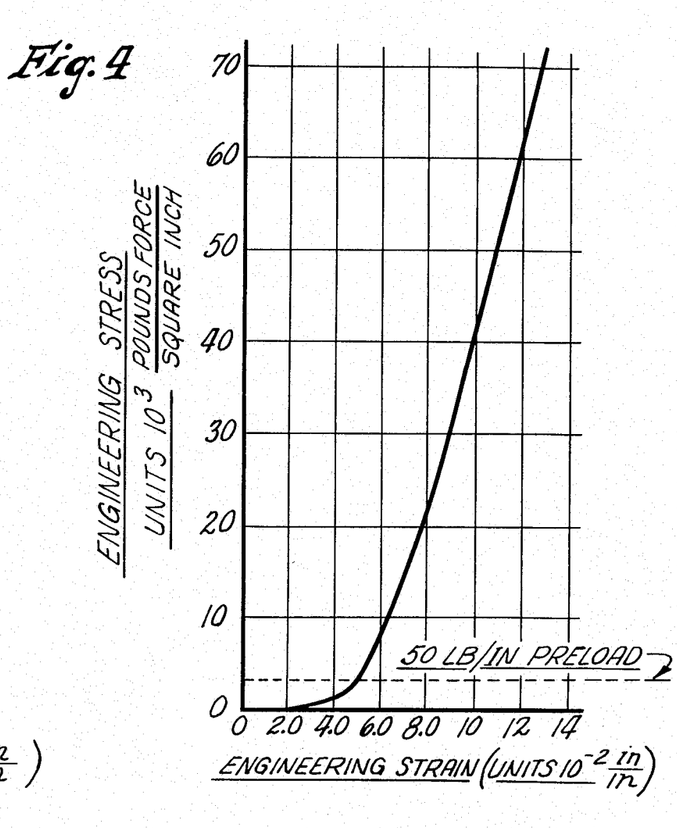
FIG. 4 is a graphical representation of the engineering stress occuring in the fabric versus the engineering strain in the fabric.

FIG. 4 is a graphical representation of engineering stress in the fabric versus the engineering strain of the fabric. The area under the curve is a measure of the amount of work per unit volume of the fabric which may be done on the fabric without causing it to rupture, neglecting frictional forces and adiabatic heating of the fabric.

Figure 5:
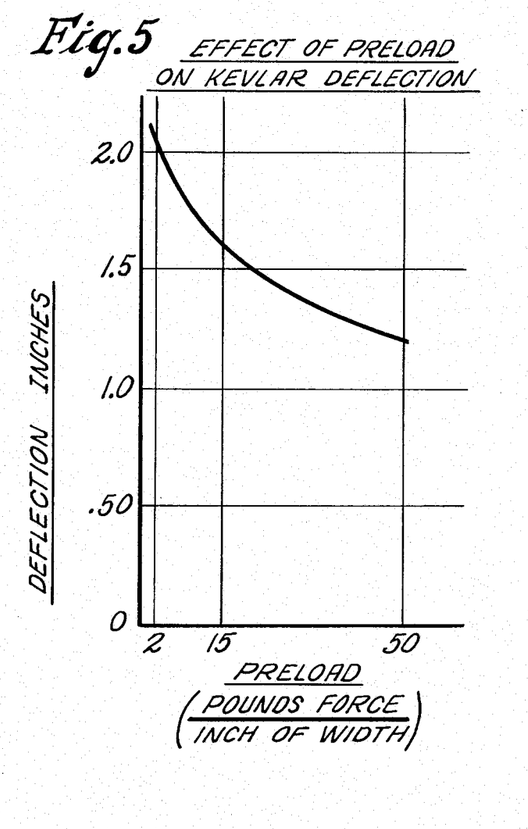
FIG. 5 is a graphical representation of the deflection of the fabric resulting from an impact against the fabric by a projectile having only radial velocity as a function of preload on the fabric in the installed condition.

FIG. 5 is a graphical representation of the deflection of the fabric resulting from an impact against the fabric by a projectile having only radial velocity as a function of preload on the fabric in the installed condition. Fifteen wraps of the woven Kevlar 29 fabric extending circumferentially about a twenty-inch diameter support structure were struck by a one-hundred and ten grain projectile. Testing demonstrated that as the preload on the fabric (and thus the tension) was increased, the amount of deflection of the fabric was decreased.

Figure 6:
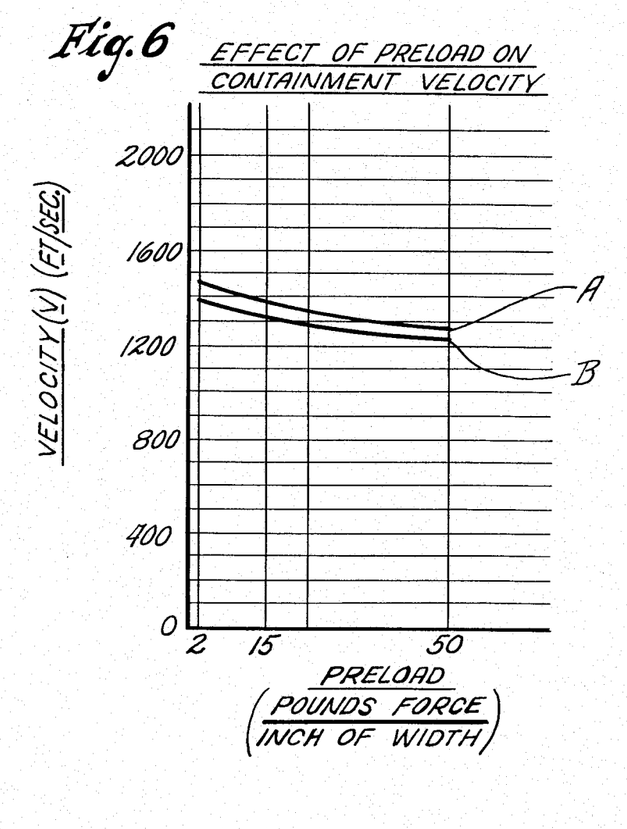
FIG. 6 is a graphical representation of the capability of the preloaded fabric to contain a projectile having only radial velocity as a function of the velocity of the projectile.

FIG. 6 is a graphical representation of the capability of the preloaded wraps of fabric to contain a one-hundred and ten grain projectile. The velocity of projectiles contained and not contained is plotted as a function of the preload (and thus the tension) on the fabric in the installed condition. As with FIG. 5, the projectile was impacted against fifteen wraps of fabric extending circumferentially about a twenty inch diameter support structure. Increased preloads on the fabric decreased the velocity at which the projectile was contained. Curve A is the lowest velocity of projectiles not contained. Curve B is the highest velocity of projectiles contained.

As shown in FIG. 2, the support structure 46 is a hollow beam which includes a first flange such as the upstream flange 48, a second flange such as the downstream flange 50, a first wall such as the inner sheet 52, and a second wall such as the outer sheet 54. A plurality of plates such as stiffeners 55 having a C-shaped cross section, extend between the outer sheet and the inner sheet of the hollow beam. Each of the C-shaped stiffeners has a rib 56 extending radially between the sheets, a first leg such as inner leg 58 and a second leg such as outer leg 60. The inner leg is spaced radially from the outer leg and radially faces the outer leg such that a radial line perpendicular to the axis of symmetry of the stiffener passes through both legs. The legs 58 and 60 extend in an axially oriented direction away from the first flange toward the second flange. The legs adapt the stiffeners to engage the sheets and are in abutting contact with the sheets. The inner leg or the outer leg may have a cylindrical or a frustoconical shape to conform to the shape of the abutting sheet. The inner sheet has a first edge, such as upstream edge 62, which adapts the sheet to be joined to the upstream flange 48 and a second edge, such as downstream edge 64, which adapts the sheet to be joined to the downstream flange 50. The outer sheet has a first edge such as the upstream edge 66, which adapts the sheet to be joined to the upstream flange 48, and a second edge such as the downstream edge 68 which adapts the sheet to be joined to the downstream flange 50.

Figures 7, 9A:
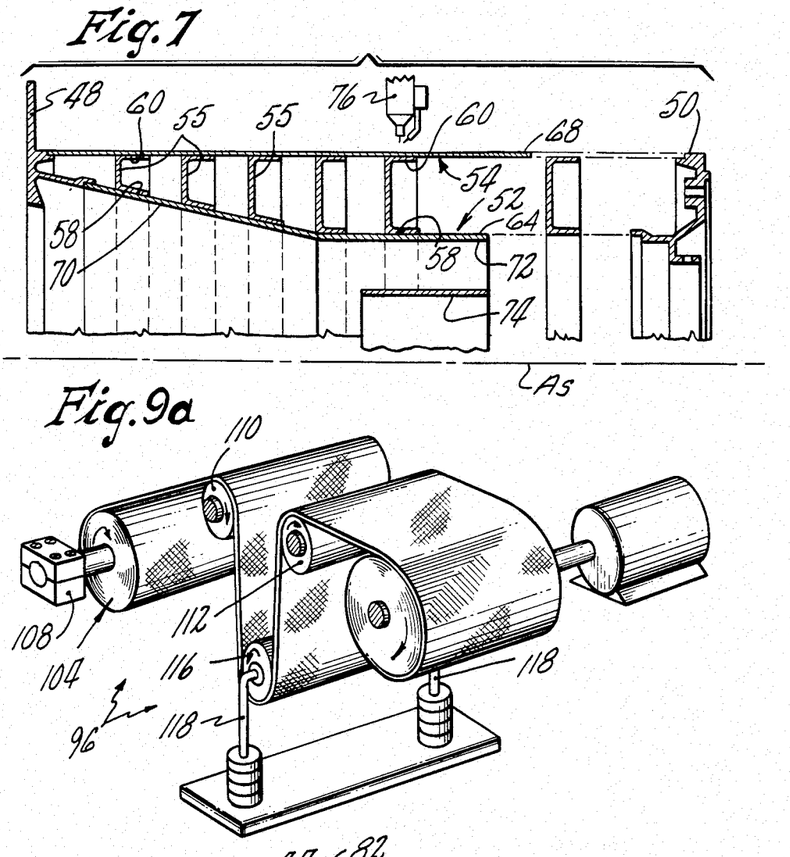

FIG. 7 is an exploded view of the support structure shown in FIG. 2 and illustrates a method for forming the support structure. The inner sheet 52 is formed of two sheets each having ends which are butt welded together to form a frustoconcical hoop 70 and a cylindrical hoop 72. The hoops are butt welded together to form the single inner sheet having a frustoconical portion transitioning into a cylindrical portion. The outer sheet is formed of two sheets having ends which are butt welded together to form a first cylindrical hoop and a second cylindrical hoop of greater diameter than the greatest diameter of the inner sheet. The hoops are butt welded together to form a single cylindrical sheet. The next step in assembling the support structure is the step of attaching an endmost (nearest an edge) C-shaped stiffener 55 to the inner sheet 52 and the outer sheet 54. The stiffener is oriented to face the legs toward the other edge of the sheets. One satisfactory method of attaching the C-shaped stiffener to the sheets is by resistance spot welding the sheets to the legs 58, 60 of the stiffener. These spot welds locate the sheets with respect to the C-shaped stiffener during the assembly procedure and do not permanently join the stiffener to the sheets. As will be realized in an alternative procedure, the C-shaped stiffener might be permanently joined to the sheets with a continuous weld at this point in the assembly procedure by welding the components with an arc welder, a resistance welder or an oxyacetylene welder. Because of the orientation of the legs 58, 60 both welds may be made simultaneously with a welder such as a resistance welder. After welding of the stiffener, both welds may be inspected.

After spot welding the first C-shaped stiffener to the inner sheet 52 and the outer sheet 54, the adjacent C-shaped stiffener is slid past the downstream edges 64, 68 of the sheets into position between the sheets. Because the inner leg 58 of the stiffener has the same frustoconical shape as the frustoconical portion of the inner sheet, the stiffener locates itself axially with respect to the inner sheet. The second C-shaped stiffener is attached to the sheets, such as by resistance spot welding, to locate the second stiffener during the assembly procedure. In a like manner, the remaining braces are assembled to the sheets. A distinct and particular advantage of this assembly procedure is that the procedure enables an inspection of each resistance spot weld as each C-shaped stiffener is inserted and spot welded. The inspection insures that the legs of the stiffener are in abutting contact with the inner sheet and outer sheet.

The subassembly comprising the inner sheet 52, the outer sheet 54 and the C-shaped stiffeners 55 is mounted on a second fixture to ensure that the support structure has a proper concentricity and diameter. The fixtured subassembly is mounted in an electron beam weld chamber. A welding shield 74 is mounted inwardly of the inner sheet. An electron beam welder 76 is positioned radially outwardly of the outer sheet and is aligned with the legs 58, 60 of a C-shaped stiffener such that the beam passes on a radial line through both the inner leg 58 and the outer leg 60. The case is rotated in alignment with the electron beam and the electron beam passes through the outer sheet, through the outer leg, through the inner leg, through the inner sheet and impinges on the shield. The electron beam permanently joins the C-shaped stiffener to the inner and outer sheets by causing fusion to occur between the legs of the stiffener and the inner and outer sheets. In a like manner, the remaining C-shaped stiffeners are joined to the inner and outer sheets. The interior of the inner sheet is inspected for evidence of welding to insure that the electron beam has gone all the way through to the interior of the case. The inspection establishes that a weld exists between the inner sheet and the inner leg and between the outer sheet and the outer leg. After the inspection the upstream flange 48 and the downstream flange 50 are fusion welded to the sheets with a heliarc welding process.

Figure 8:
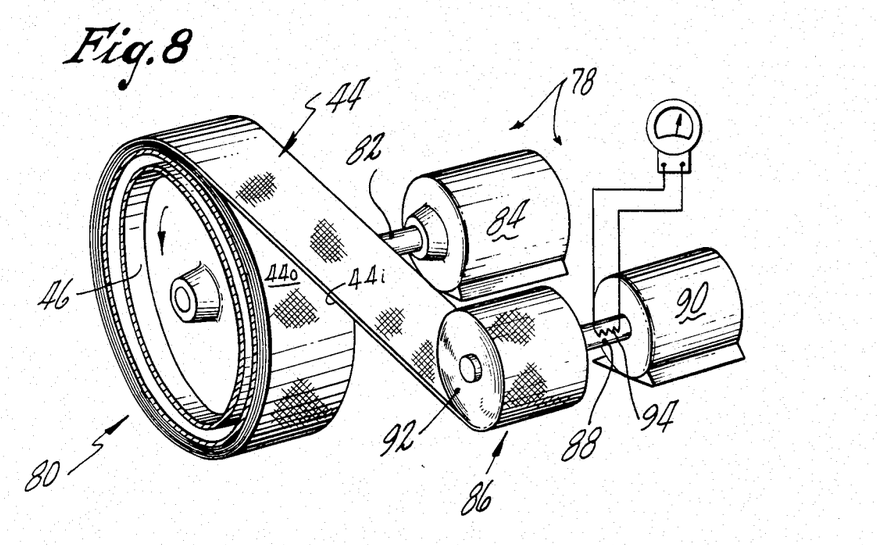
FIG. 8 is a schematic illustration of an apparatus for wrapping fabric under tension about the support structure.

FIG. 8 shows a machine 78 for wrapping the fabric 44 about the support structure 46. As the fabric is wound about the support structure, the fabric has an outwardly facing first surface 44o and an inwardly facing second surface 44i. The machine includes a first apparatus 80 for applying the fabric to the support structure. The first apparatus has a shaft 82 and a means 84 for rotating the shaft. The support structure 46 is mounted on the shaft. A second apparatus 86 for feeding the fabric has a shaft 88 and a means 90 for rotating the shaft. A reel 92 is mounted on the shaft 88. Fabric is wrapped about the reel with a preload that is less than the preload on the fabric in the installed condition. A strain gauge 94 on the shaft 88 measures the torque being applied to the shaft. The preload and the resulting tension in the fabric are easily determined from the torque in the shaft. The fabric is fed under tension from the reel by rotating the reel through an angle to unwind a first length of the fabric from the reel. A preload (and the associated tension) is applied to the fabric by rotating the support structure 46 mountedd on the shaft through an angle to wind a second length of fabric onto the structure which is greater than the first length of the fabric. By causing an elongation of a known amount in the length of the fabric, the tension in the fabric resists subsequent deflections of the fabric during the impact of a particle with a spring constant of the fabric which is greater than the first spring constant approximated by line A of FIG. 3. For example, this greater spring constant may approximate the third spring constant of the fabric as shown by the line C of FIG. 3. The third spring constant results from applying a tension to the fabric in the installed condition which is equal to the tension that results from applying a uniform load lying in a range of forty-five to fifty-five pounds of force per inch of axial width of fabric wherein the load is distributed uniformly over the width of the fabric, and acts tangentially to the fabric on the minimum cross-sectional area presented by the fabric to the load. For example, such a tension is achieved in a fabric having a width of eleven inches by applying a uniform load of five hundred and fifty (550) pounds of force plus or minus fifty-five ($\pm 55$) pounds to the fabric. Alternatively, the greater spring constant chosen may approximate the second spring constant of the fabric as shown by line B of FIG. 3. The second spring constant corresponds to a fabric under a preload which is greater than or equal to ten pounds per inch of axial width.

Figure 8A:
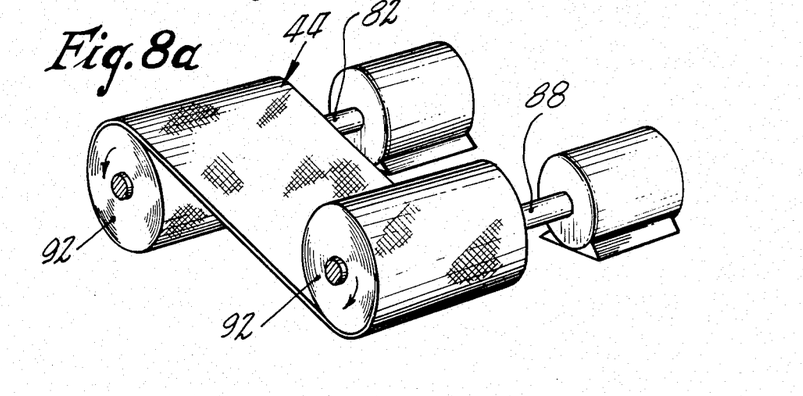
FIG. 8a is a schematic illustration of an apparatus for wrapping fabric under tension during the transfer of fabric from one reel of fabric to another.

As shown in FIG. 8a, an alternate method of applying the preload to the fabric uses at least one intermediate second reel 92. For example, a second reel 92 empty of fabric may be mounted in the shaft 82 of the first apparatus in place of the support structure 46. The second reel 92 receives fabric from the first reel 92 at a preload which is less than the preload on the fabric in the installed condition. Wrapping the fabric at a smaller preload than, for example, five hundred and fifty (550) pounds of force facilitates control of the tension in the fabric during the wrapping process and results in increasing the elongation of the fabric an incremental amount which is less than the elongation of the fabric in the installed condition. After wrapping the second reel 92, the second reel may be shifted to the shaft 88 of the second apparatus for feeding the fabric onto a new second reel 92 mounted on the shaft 82 of the first apparatus. This process may be repeated until the fabric is wrapped on a reel 92 at a preload (and under an associated tension) which is equal to the tension in the fabric in the installed condition. The fabric may then be wrapped on the support structure 46 with no further elongation in the fabric.

Wrapping of the support structure is begun by taping the fabric to the support structure or otherwise holding the fabric in place and hand laying one hundred-eighty degrees (180°) of the first wrap with no load on the fabric (zero tension). The remaining one hundred-eighty degrees of the first wrap is applied and, as this second half of the first wrap is applied, the tension in the fabric is increased by uniformly increasing the load from zero pounds of force (0 lb$_f$) to fifty pounds of force plus or minus five pounds of force per inch of width (50$\pm$5 lb$_f$/in) of the fabric. Fabric under such a preload has elongated approximately five percent (5%) of the free length of the fabric. The tension is maintained within these limits and an additional thirty-eight wraps are applied to the case. The last containment wrap (thirty-ninth wrap) 39 is applied over the preceding containment wrap (thirty-eighth wrap). The frictional force between all of the wraps of the fabric is such that leaving the thirty-ninth wrap free would result in a small amount of unwrapping and a relaxation of the tension in only the outermost layers of the fabric. The relaxation in tension in the outermost layer is avoided by securing the fabric against unwrapping. One method of securing the fabric against unwrapping includes the step of restraining a portion of the fabric against movement with respect to a second portion of the fabric such as by bonding a portion of the fabric to a second portion of the fabric. For example, the last containment wrap (thirty-ninth wrap) is secured against unwrapping by bonding the outwardly facing surface 44$o$ of the thirty-eighth wrap to the inwardly facing surface 44$i$ of the the thirty-ninth wrap. The bonding is done by applying a rubber base adhesive to a portion of one of the surfaces, pressing the adhesive-covered surface against the faying surface and restraining the fabric against movement until the adhesive cures. One satisfactory rubber-base adhesive is a silicone rubber compound, such as RTV 159 silicone rubber compound distributed by the General Electric Corporation, Silicone Products Division, Waterford, N.Y. This particular adhesive is cured at room temperature.

The nacelle shields the exterior of the fabric from damage in the installed condition. An additional wrap (fortieth wrap) is applied in tension over the preceding wrap (thirty-ninth wrap). A second shield 95 is provided by applying a coating of epoxy resin to the exterior of the wrapped fabric. The method of forming the shield includes the step of applying a first coating of epoxy resin between the beginning of a forty-first wrap and the beginning of the fortieth wrap and to the outer surface of the wrapped fabric. The epoxy resin has a viscosity during application which is in the range of ten to sixteen Pascal-seconds (10–16 Pa.s). The fabric is held under tension until the epoxy cures. The first coating of epoxy resin does not penetrate to the thirty-ninth wrap because the tension on the fabric causes the strands of the fabric to press tightly one to the other blocking penetration of the fabric by the resin. The high viscosity of the epoxy resin of the first coating retards the penetration of the resin into the fabric as the resin cures. Moreover, as the epoxy resin cures, the resin generates heat, which increases the rate at which the resin cures. The method of forming a shield includes the additional step of applying a second coating of epoxy resin to the first coating of epoxy resin, the second coating having a second viscosity during application in the range of five-tenths to seven-tenths Pascal-seconds (0.5–0.7 Pa.s). The second coating of epoxy resin cannot penetrate the first coating of epoxy resin because the first coating of epoxy resin has cured and forms a shield against penetration. In addition to applying the epoxy resin to the outer surface of the fabric, the resin may also be applied to the edges of the wrapped fabric. One satisfactory epoxy resin for the first coating is EPON Resin 828 epoxy resin distributed by the Shell Chemical Company, a division of Shell Oil Company, Houston, Tex. One satisfactory epoxy resin for second coating is EPON Resin 815 or 8132 epoxy resin which is available from the Shell Chemical Company. A satisfactory curing agent for the three resins from the Shell Chemical Company is EPON U Curing Agent which is available from the Shell Chemical Company.

Figure 9:
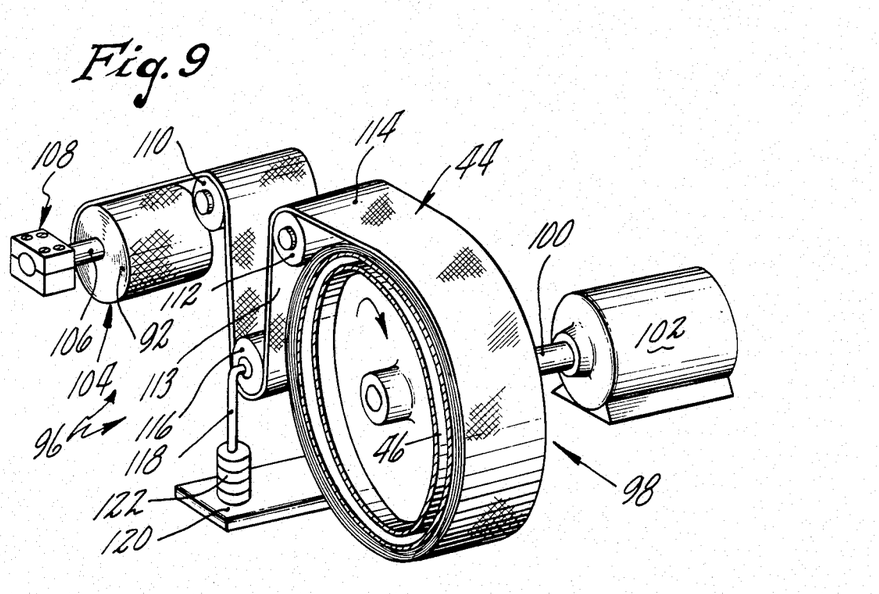
FIG. 9 is a schematic illustration of an alternate embodiment of the apparatus shown in FIG. 8 and is an embodiment utilizing a suspended weight to preload the fabric.

FIG. 9 shows an alternate embodiment 96 of machine 78 for wrapping the fabric 44 about the support structure 46. The machine includes a first apparatus 98 for applying the fabric to the support structure. The first apparatus includes a shaft 100 and a means for rotating the shaft 102. A second apparatus 104 for feeding the fabric includes a shaft 106 and a means for rotating the shaft an incremental amount 108. The reel 92 of fabric is attached to the shaft 106. A first roller 110 and a second roller 112 guide the fabric and are attached to a suitable support (not shown). The fabric has an inwardly facing surface 113 and an outwardly facing surface 114.

A third roller 116 rotatably engages the outwardly facing surface 114 of the fabric 44. Two elements, as represented by the bar 118, extend downwardly from the third roller. A shelf 120 is attached to the bars. A weight 122 is placed on the shelf to load the roller and through the roller to provide a preload to the fabric. During the step of wrapping the fabric about the support structure 46 of the fan case 30 the fabric is fed from the first reel 92 and is taken up by the support structure 46. The shelf which is suspended by the third roller from the fabric exerts a predetermined downward force on the fabric even though the height of the roller above a reference plane may vary as the fabric moves through the third roller. The method of wrapping the support structure otherwise proceeds in an identical fashion to the method of wrapping the support structure with the machine 78.

FIG. 9a illustrates an alternate method of applying the preload to the fabric using at least one intermediate reel 92 and the apparatus 96 shown in FIG. 9.

During operation of the engine, the rotor assembly 26 shown in FIG. 2 rotates about the axis of rotation $A_r$ at speeds as high as four thousound revolutions per minute. As the rotor assembly rotates, the disk 33 exerts a centripetal force on the root region 36 causing the blade to follow a circular path about the axis of rotation $A_r$ of the rotor assembly. An impact on the blade by a foreign object may cause the blade to fail in the root region. The following description is illustrative of a typical interaction between the blade, the support structure and the fabric during such a blade failure. This description is not an exhaustive description of all possible interactions between the components during the blade failure. Upon failure, the blade breaks in the root region and moves radially outwardly across the gap G (between the tip region 40 and the rub strip 42), strikes the rub strip and fragmentizes. Typically, the tip region of the blade breaks off from the rotor blade leaving behind the root 36 and midspan region 38 of the blade. The fragments of the tip region move forwardly with a relatively high axial velocity because of the shape of the flow path and because of the difference in pressure which exists between the leading edge and the trailing edge of the blade. The midspan and base region of the blade form a second portion 124 of the blade which moves radially outwardly across the radial distance occupied by the tip region and across the gap G to strike the rub strip. The second portion of the blade is of larger size and has more energy than the tip region of the blade.

Figures 10, 11, 12, 14:
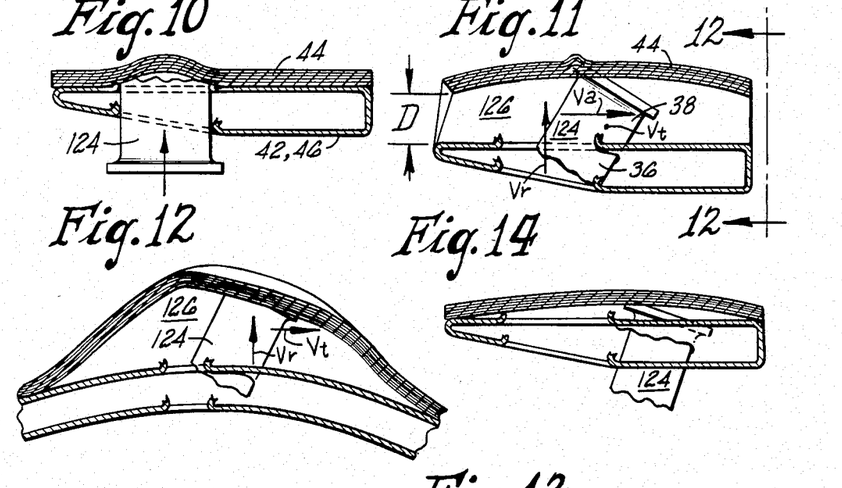
FIG. 10 is a schematic representation of a portion of a blade moving outwardly, piercing the rub strip and support structure.
FIG. 11 is a schematic representation of a portion of a blade that has penetrated the support structure and deflected the fabric wrapping.
FIG. 12 is a side elevation view taken along the lines 12—12 of FIG. 11.
FIG. 14 is a schematic representation of the blade fragment trapped between the support structure and circumferentially extending fabric.

As shown in the FIG. 10 schematic representation, the energy and strength of the second portion 124 of the blade enables the second portion 124 of the blade to penetrate the rub strip 42 and the support structure 46 without shattering the blade portion and to strike the Kevlar fabric 44. The Kevlar fabric restrains the outward movement of the second portion of of the blade and decreases the outward velocity of the blade.

As the second portion 124 of the blade moves outwardly, the second portion of the blade is struck from behind by the adjacent (following) blade. The following blade turns the root region 36 of the blade outwardly and the midspan region 38 inwardly and drives the second portion of the blade around the circumference of the support structure, slashing a hole in the support structure. The second portion of the blade has an axial rearward component of velocity $V_a$ as a result of being struck by the following blade and because of this contact and the rotational energy of the blade, the second portion of the blade has also a radial outward component of velocity $V_r$ and a tangential component velocity $V_t$ in a circumferential direction. As shown in the FIG. 11 schematic representation, the second portion of the blade 124 has penetrated through the support structure and has impacted against the fabric 44 causing the fabric to deflect outwardly a distance D away from the case.

Figures 12A, 13, 15:
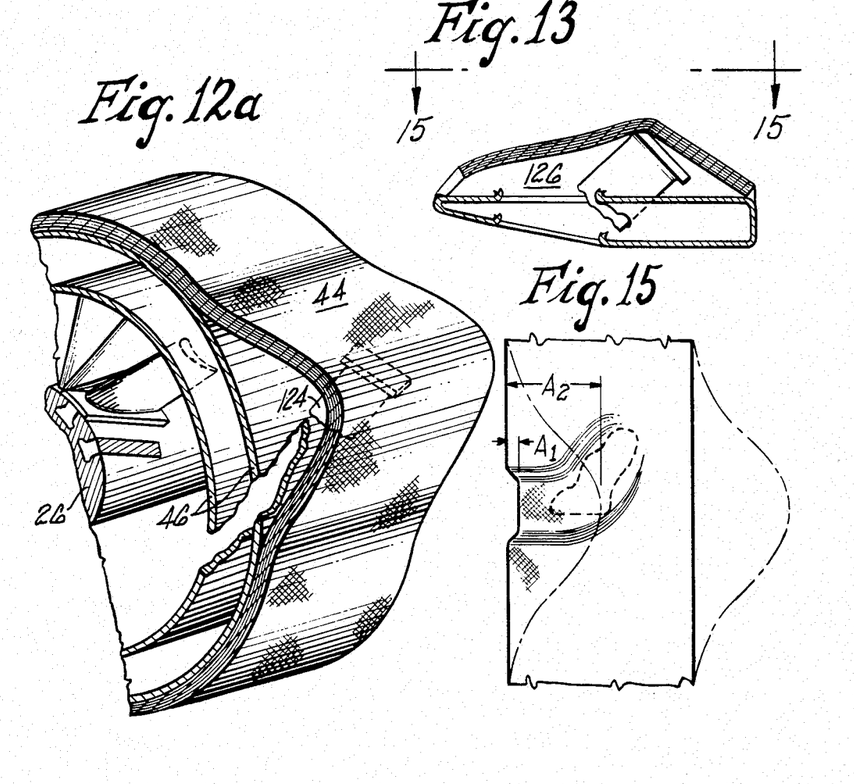
FIG. 12a is a perspective view of the rotor assembly, the blade fragment of the rotor assembly, the support structure and the fabric, partly in section and partly broken away.
FIG. 13 is a schematic representation corresponding to FIG. 10 of the portion of the blade after the blade has moved axially with respect to the point of penetration of the support structure.
FIG. 15 is a plan top view along the lines 15—15 of FIG. 13.

FIG. 12 is a side elevation view taken along the lines 12—12 of the schematic representation shown in FIG. 11. FIG. 12a is a perspective view of the rotor assembly 26, the blade portion 124, the support structure 46 and the fabric 44. As the second portion of the blade strikes the fabric and causes the fabric to deflect, a passageway 126 opens for the blade in the axial direction. As shown in FIG. 3, the preload causes the layers of Kevlar fabric to exert a greater radial force during an incremental deflection than the force exerted by untensioned Kevlar fabric during the same deflection. The preload also increases the amount of work absorbed per unit of elongation of the fabric as shown by the area under the stress-strain curve in FIG. 4. Thus, the deflection of the fabric away from the support structure per unit of energy absorbed is decreased as compared with loosely wrapped fabric.

Experiments on ballistic models indicate that a Kevlar fabric wrap under no tension when hit by a particle will deflect a distance D of seven and one-half (7.5 in.) away from a support structure 46 having a diameter of eighty (80) inches. These experiments indicate that preloading the Kevlar fabric with a preload of fifty pounds force plus or minus five pounds of force ($50 \pm 5$ lb$_f$) per inch of axial width, will decrease the deflection D of the Kevlar from seven and one-half inches (7.5 in.) to three and one-half inches (3.5 in.).

After the maximum deflection of the fabric, the preloaded fabric moves inwardly. The passageway 126 closes before the axial component of velocity of the second portion of the blade causes the blade to move through the passageway out from under the Kevlar fabric.

As shown in FIG. 13 and FIG. 14, the Kevlar fabric begins to snap back towards the case around the blade fragment trapping the fragment between the support structure and the Kevlar.

As shown in FIG. 15, a reduced plan view, the preload (and the associated tension) in the Kevlar fabric also limits the deflection of the Kevlar fabric in the axial direction causing the Kevlar fabric to move axially rearwardly a small distance $A_1$ as compared with the distance $A_2$ that untensioned Kevlar fabric (shown in dotted line) might move. The small axial deflection of the Kevlar fabric keeps the fabric over the hole through the support structure and avoids exposing the nacelle to additional fan blade fragments from other damaged fan blades which might otherwise exit through the support structure and past the moved Kevlar.

The deflection of the fabric 44 shatters the epoxy shield protecting the fabric from the elements. The adhesive bond between the thirty-eighth wrap and the thirty-ninth wrap is not destroyed by the maximum deflection of the fabric because the rubber base adhesive bond between the last two containment wraps of the fabric flexibly attaches the wraps together. The fabric does not unwrap and no loss of tension occurs in the containment wraps of the fabric.

Although the invention has been shown and described with respect to preferred embodiments thereof, it should be understood by those skilled in the art that various changes and omissions in the form and detail thereof may be made therein without departing from the spirit and scope of the invention.

I claim:

1. A method of forming a containment case for a rotary machine having a working medium flow path to contain particles having an axial component of velocity and a radial component of velocity which includes the steps of:
   forming a first structure for supporting and positioning a fabric about said working medium flow path;
   wrapping a fabric about the first structure under tension such that the installed length of the fabric is greater than the free length of the fabric.

2. A method of forming a containment case for a rotary machine having a working medium flow path, the containment case including a fabric extending circumferentially about the case, including the steps of:
   forming a structure for supporting and positioning the fabric about said working medium flow path;
   applying a preload to the fabric to cause an elongation of the fabric;
   securing the elongated fabric against contraction;
   wrapping the preloaded, elongated fabric about the support structure under tension;
   wherein the elongation of the fabric causes a tension in the fabric in the installed condition.

3. The method of forming a containment structure of claim 2 wherein the step of applying a preload to the fabric includes the step of increasing the preload until an elongation occurs of at least five percent (5%) of the free length of the fabric.

4. The method of forming a containment structure of claim 2 which further includes the step of feeding the fabric from a reel by rotating the reel through an angle such that a first length of the fabric is unwound from the reel and wherein the step of applying a preload to the fabric includes the step of rotating the support structure through an angle such that a second length of fabric is wound onto the case wherein the second length of fabric is equal to or greater than the first length of fabric.

5. The method of forming the containment structure of claim 2 wherein the step of applying a preload to the fabric includes the step of suspending a weight from the fabric.

6. The method of forming a containment case of claim 2 wherein the fabric has a first spring constant under a first tension and a second spring constant under a second tension which is greater than the first spring constant and wherein the step of wrapping the fabric about the support structure occurs under a level of tension in the fabric which is equal to or greater than the second tension.

7. The method of forming a containment case of claim 6 which further includes the step of securing the fabric against unwrapping by restraining a portion of the fabric against movement.

8. The method of forming a containment structure of claim 6 wherein the fabric has an end and the step of wrapping the preloaded fabric includes the step of securing the end of the fabric to the support structure.

9. The method of forming a containment case of claim 6 wherein the step of securing the fabric against unwrapping further includes the step of restraining a portion of the fabric against movement with respect to a second portion of the fabric.

10. The method of forming the containment case of claim 9 wherein the fabric has a first surface facing outwardly and a second surface facing inwardly, wherein the step of wrapping the fabric about the support structure further includes the step of applying at least one complete wrap to the structure and the step of securing the elongated fabric against unwrapping includes the step of bonding a portion of the outwardly facing first surface to a portion of the inwardly facing second surface.

11. The method of forming a containment case of claim 10 wherein the step of bonding a portion of the outwardly facing surface to a portion of the inwardly facing surface includes the steps of applying a rubber base adhesive to a portion of one of the surfaces, pressing the adhesive covered surface against the faying surface, and restraining the fabric against movement.

12. The method of forming a containment case of claim 2 or 6 wherein the step of wrapping the fabric about the support structure is performed at a tension in the fabric which is equal to the tension produced by a load which is equal to or greater than ten pounds of force per inch of axial length of fabric wherein the load is distributed uniformly over the width of the fabric and acts tangentially to the fabric on the minimum cross-sectional area presented by the fabric to the load.

13. The method of forming a containment case of claim 6 wherein the load lies in a range of forty-five (45) pounds of force to fifty-five pounds of force per axial inch of fabric.

14. The method of forming a containment case of claim 2, 3, 4, 5, 6, or 13 wherein the step of applying a preload to the fabric to cause an elongation of the fabric includes the step of wrapping the fabric circumferentially around at least one reel to increase the elongation an incremental amount which is less than or equal to the elongation of the fabric in the installed condition.

15. The method of forming a containment case of claim 6 which further includes the step of forming a shield over the exterior of the fabric.

16. The method of forming a containment structure of claim 15 wherein the step of forming a shield includes the step of applying a coating of epoxy resin to the exterior of the wrapped fabric.

* * * * *